US012290904B2

(12) United States Patent
Leckey

(10) Patent No.: US 12,290,904 B2
(45) Date of Patent: May 6, 2025

(54) DEEPLY EMBEDDED HELICAL COIL EXTRACTION DEVICE

(71) Applicant: Goodrich Corporation, Charlotte, NC (US)

(72) Inventor: Jordan Leckey, Hinesburg, VT (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/536,643

(22) Filed: Dec. 12, 2023

(65) Prior Publication Data
US 2024/0123588 A1 Apr. 18, 2024

Related U.S. Application Data

(62) Division of application No. 17/900,628, filed on Aug. 31, 2022, now Pat. No. 11,872,677.

(51) Int. Cl.
B23P 19/00 (2006.01)
B25B 27/30 (2006.01)
B64C 25/36 (2006.01)
B64C 25/42 (2006.01)

(52) U.S. Cl.
CPC .............. B25B 27/30 (2013.01); B64C 25/36 (2013.01); B64C 25/42 (2013.01)

(58) Field of Classification Search
CPC ......... B23P 19/04; B23P 11/005; B23P 19/00; B25D 3/00; B25B 27/30; B64C 25/36; B64C 25/42
See application file for complete search history.

(56) References Cited

U.S. PATENT DOCUMENTS

| 178,627 | A | * | 6/1876 | Gordon et al. | .......... B25G 3/08 279/97 |
| 2,244,824 | A | | 6/1941 | Caminez | |
| 2,513,792 | A | | 7/1950 | Foster | |
| 4,716,797 | A | | 1/1988 | Colvin | |
| 5,507,083 | A | * | 4/1996 | Redgrave | .............. B25B 27/306 29/227 |
| 5,659,936 | A | * | 8/1997 | Ploeger | ................. B25B 27/306 29/426.6 |

(Continued)

FOREIGN PATENT DOCUMENTS

BE 470214 1/1947
GB 842345 7/1960

OTHER PUBLICATIONS

European Patent Office, European Search Report dated Feb. 8, 2024 in Application No. 23194069.3.

(Continued)

Primary Examiner — Lee D Wilson
(74) Attorney, Agent, or Firm — SNELL & WILMER L.L.P.

(57) ABSTRACT

A device for extracting a deeply embedded helical coil is provided. The device includes a shaft, the shaft comprising a proximal end and a distal end; and a blade coupled to the distal end of the shaft, wherein the blade is configured to traverse into a mounting hole to engage the deeply embedded helical coil free of contact with a side of the mounting hole and wherein the deeply embedded helical coil is at least three to five thread pitches below a surface of the mounting hole.

4 Claims, 9 Drawing Sheets

(56) References Cited

U.S. PATENT DOCUMENTS

| | | | | |
|---|---|---|---|---|
| 6,108,882 | A | * | 8/2000 | Hodgson ............... B25B 27/306 |
| | | | | 269/6 |
| 6,886,229 | B1 | * | 5/2005 | Wilson .................... B25B 27/04 |
| | | | | 29/278 |
| 7,131,175 | B2 | | 11/2006 | Young |
| 7,337,515 | B2 | | 3/2008 | Phillips et al. |
| D627,617 | S | * | 11/2010 | Chambers ........................ D8/89 |
| 8,495,777 | B1 | | 7/2013 | Dixon |
| 8,826,544 | B1 | | 9/2014 | Savage et al. |
| 9,402,337 | B2 | | 8/2016 | Al-Taweel |
| 11,872,677 | B1 | * | 1/2024 | Leckey ................... B25B 27/30 |
| 2003/0061695 | A1 | * | 4/2003 | Kang .................... B25B 27/306 |
| | | | | 29/227 |
| 2006/0265847 | A1 | * | 11/2006 | Horsman ............. B25B 27/306 |
| | | | | 29/225 |
| 2007/0062046 | A1 | | 3/2007 | Hsu |
| 2013/0205557 | A1 | | 8/2013 | MacArthur et al. |

OTHER PUBLICATIONS

USPTO; Requirement for Restriction/Election filed Mar. 16, 2023 in U.S. Appl. No. 17/900,628.
USPTO; Non-Final Office Action filed Jun. 12, 2023 in U.S. Appl. No. 17/900,628.
USPTO; Notice of Allowance filed Sep. 20, 2023 in U.S. Appl. No. 17/900,628.

* cited by examiner

DEEPLY EMBEDDED HELICAL COIL EXTRACTION DEVICE

CROSS-REFERENCE TO RELATED APPLICATIONS

This application is a divisional of, and claims priority to and the benefit of, U.S. patent application Ser. No. 17/900,628, filed Aug. 31, 2022, entitled "DEEPLY EMBEDDED HELICAL COIL EXTRACTION DEVICE," which is hereby incorporated by reference in their entirety for all purposes.

FIELD

The present disclosure relates to a helical coil extraction device for extracting deeply embedded helical coils.

BACKGROUND

Tanged helical coils are used in various applications, including manufacturing, electrical engineering, aerospace, medical devices, telecommunications, and more. A common example in the aerospace industry is for brake actuators. In order that pre-drilled threads in a brake actuator hub exhibit increased thread strength and retention force, a helical coil is inserted into a pre-drilled threaded hole and then brake actuators are attached to the brake housing using a bolt whose threads grip into the helical coil that is gripping the pre-drilled threads in the brake actuator hub. However, off-the-shelf tanged helical coil extraction devices are currently designed for shallowly installed helical coils.

SUMMARY

According to various embodiments of the present disclosure, a device for extracting a deeply embedded helical coil is provided. The device includes a shaft, the shaft comprising a proximal end and a distal end; and a blade coupled to the distal end of the shaft, where the blade is configured to traverse into a mounting hole to engage the deeply embedded helical coil free of contact with a side of the mounting hole and where the deeply embedded helical coil is at least three to five thread pitches below a surface of the mounting hole.

In various embodiments, the blade comprises a first portion and a second portion, where the second portion tapers from first width at a first end to a second width at a second end, where the second width is smaller than the first width, and where the first end couples the second portion of the blade to the first portion of the blade. In various embodiments, an angle of the taper is between 12 degrees and 18 degrees. In various embodiments, a width of the blade at the first end of the first portion has a diameter-to-width ratio of 1:1 with respect to a nominal diameter of the deeply embedded helical coil. In various embodiments, a width of the blade at the second end of the second portion has a width-to-diameter ratio of 4:5 with respect to a nominal diameter of the deeply embedded helical coil. In various embodiments, the first portion is rectangular in shape and is configured to be received within a slot of the shaft to which the blade is coupled. In various embodiments, the blade comprises beveled edges along a portion of the second portion of the blade. In various embodiments, a length of the blade has a diameter-to-length ratio of 5:24 with respect to diameter of the deeply embedded helical coil, where a length of the first portion has a diameter-to-length ratio of 5:12 with respect to diameter of the deeply embedded helical coil; and where a length of the second portion has a diameter-to-length ratio of 5:12 with respect to diameter of the deeply embedded helical coil. In various embodiments, a thickness of the blade has a thickness-to-diameter ratio of 1:5 with respect to a nominal diameter of the deeply embedded helical coil. In various embodiments, an angled width of the second end of the blade has a width-to-diameter ratio of 1:1.4 with respect to a nominal diameter of the deeply embedded helical coil.

In various embodiments, the blade is hardened via a hardening process that includes: wrapping the blade in heat treatment foil; heat treating the blade at a first temperature; performing a first air quenching the blade at a second temperature that is less than the first temperature; performing a first tempering at a third temperature, wherein the third temperature is less than the first temperature and more than the second temperature; performing a second air quenching the blade at the second temperature; performing a second tempering at the third temperature; and performing a third air quenching the blade at the second temperature.

Also disclose herein is a method for extracting a deeply embedded helical coil. The method includes inserting a blade into a mounting hole to engage the deeply embedded helical coil free of contact with a side of the mounting hole; and, responsive to the blade engaging the deeply embedded helical coil, rotating the blade and the deeply embedded helical coil to remove the deeply embedded helical coil from the mounting hole, where the deeply embedded helical coil is at least three to five thread pitches below a surface of the mounting hole, and where the blade is coupled to a distal end of a shaft.

In various embodiments, the blade comprises a first portion and a second portion, where the second portion tapers from first width at a first end to a second width at a second end, where the second width is smaller than the first width, where the first end couples the second portion of the blade to the first portion of the blade. In various embodiments, an angle of the taper is between 12 degrees and 18 degrees. In various embodiments, a width of the blade at the first end of the first portion has a diameter-to-width ratio of 1:1 with respect to a nominal diameter of the deeply embedded helical coil. In various embodiments, a width of the blade at the second end of the second portion has a width-to-diameter ratio of 4:5 with respect to a nominal diameter of the deeply embedded helical coil. In various embodiments, the first portion is rectangular in shape and is configured to be received within a slot of the shaft to which the blade is coupled. In various embodiments, the blade comprises beveled edges along a portion of the second portion of the blade. In various embodiments, a length of the blade has a diameter-to-length ratio of 5:24 with respect to diameter of the deeply embedded helical coil, where a length of the first portion has a diameter-to-length ratio of 5:12 with respect to diameter of the deeply embedded helical coil; and where a length of the second portion has a diameter-to-length ratio of 5:12 with respect to diameter of the deeply embedded helical coil. In various embodiments, a thickness of the blade has a thickness-to-diameter ratio of 1:5 with respect to a nominal diameter of the deeply embedded helical coil. In various embodiments, an angled width of the second end of the blade has a width-to-diameter ratio of 1:1.4 with respect to a nominal diameter of the deeply embedded helical coil.

In various embodiments, the method further includes: hardening the blade, where hardening comprises: wrapping the blade in heat treatment foil; heat treating the blade at a first temperature; performing a first air quenching the blade at a second temperature that is less than the first temperature; performing a first tempering at a third temperature, wherein the third temperature is less than the first temperature and more than the second temperature; performing a second air quenching the blade at the second temperature; performing a second tempering at the third temperature; and performing a third air quenching the blade at the second temperature.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein is a helical coil extraction device for extracting deeply embedded helical coils. The helical coil extraction device includes a custom "blade" or "spade" to traverse deeply into brake actuator mounting holes of a brake actuator hub and remove worn or damaged helical coils. The helical coil extraction device is designed with a shallower taper and a narrower width to avoid potential damage to the brake actuator hub housing that the helical coil is installed into. The helical coil extraction device is designed to bite into the deeply installed helical coil. The custom "blade" or "spade" of the helical coil extraction device is further heat treated using a specific heat-treating process to withstand the forces associated with the removal process.

Figure 1:
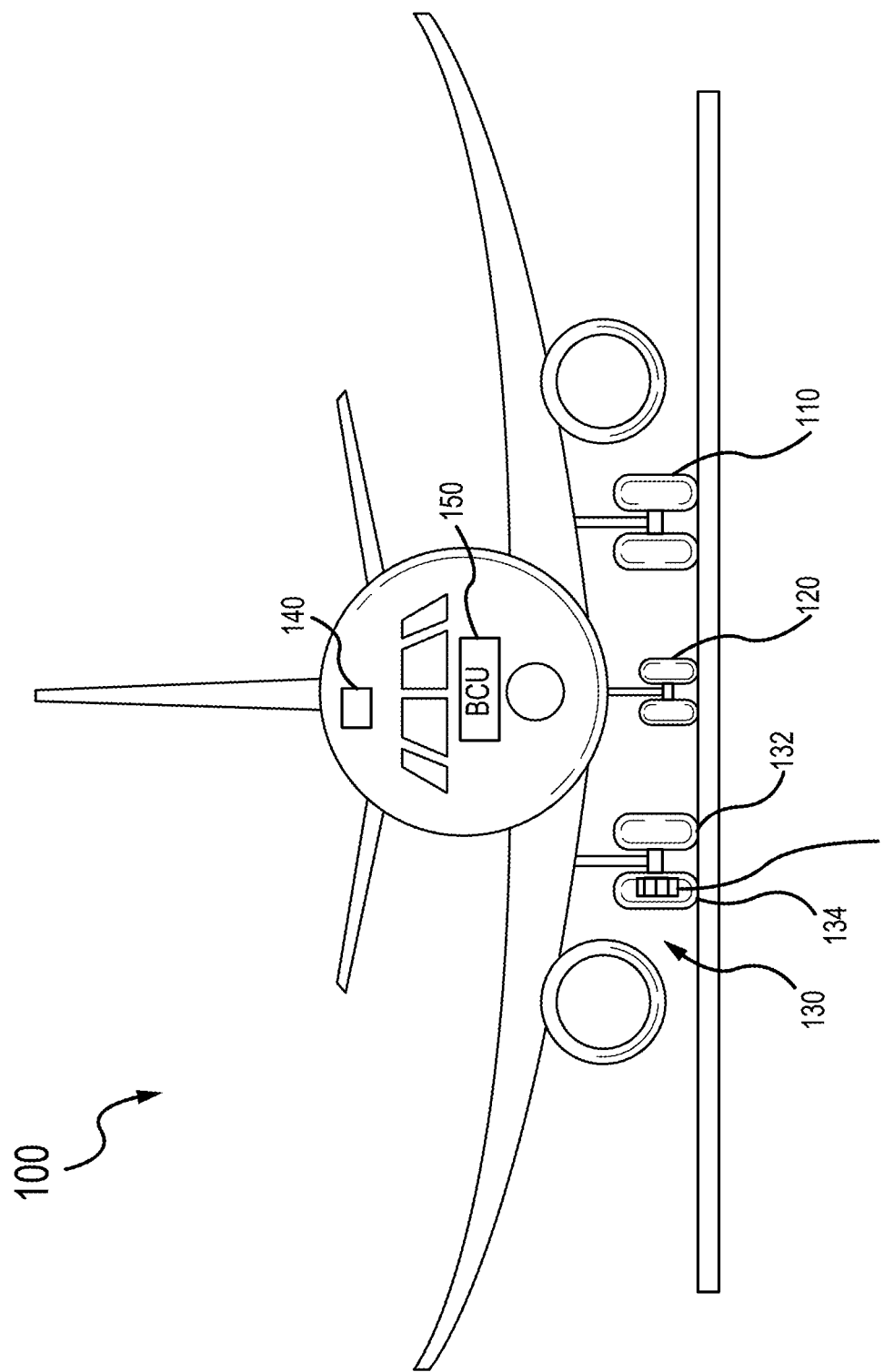
FIG. 1 illustrates an aircraft that includes multiple landing gear systems, in accordance with various embodiments.

Referring now to FIG. 1, in accordance with various embodiments, an aircraft 100 that includes multiple landing gear systems, including a first landing gear 110, second landing gear 120, and third landing gear 130 is illustrated. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and often times, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

In various embodiments, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 includes any number of wheels.

Figure 2:
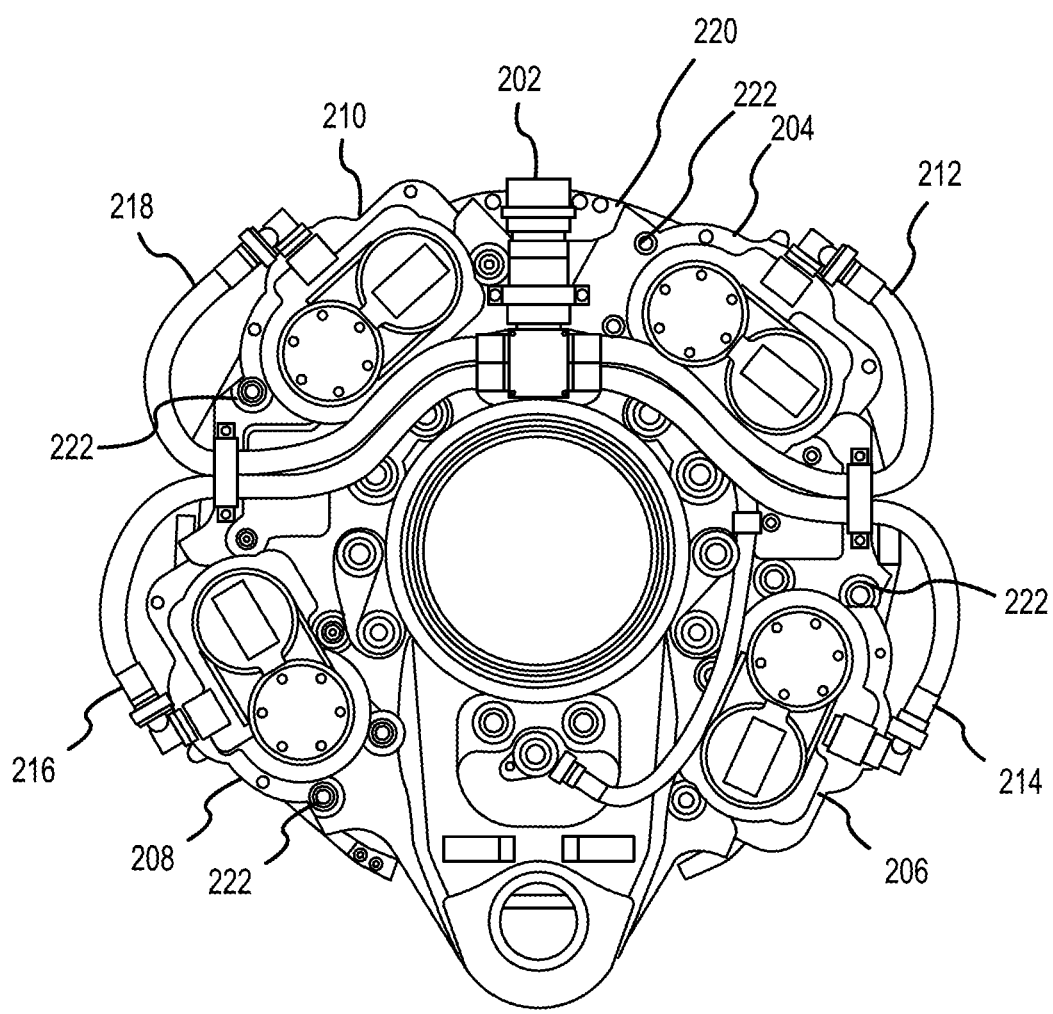
FIG. 2 illustrates a brake system, in accordance with various embodiments.
Figure 3:
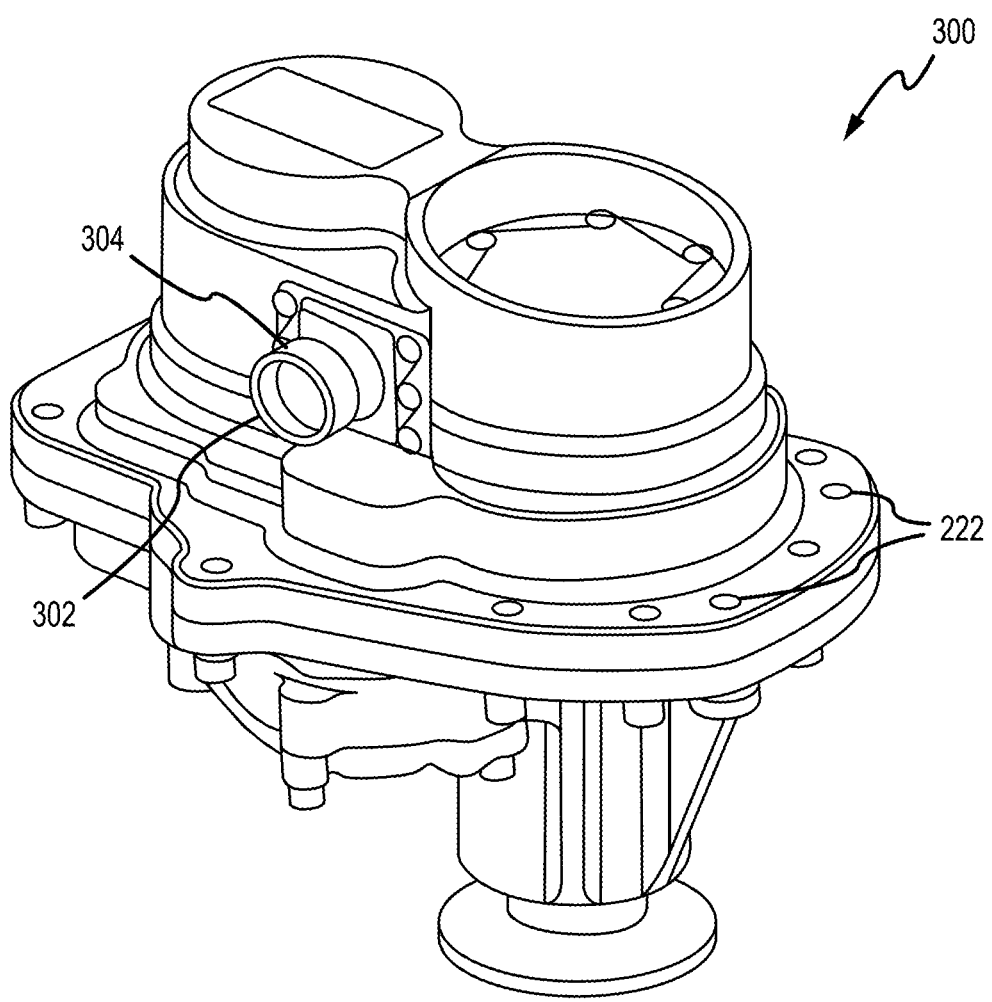
FIG. 3 illustrates a brake actuator, in accordance with various embodiments.

Referring now to FIG. 2, in accordance with various embodiments, a brake system 200 is illustrated. In various embodiments, brake system 200 includes main electrical connector 202 coupled to electronic brake actuators 204, 206, 208, and 210 via respective electronic brake actuator cables 212, 214, 216, and 218. In various embodiments, each of the electronic brake actuators 204, 206, 208, and 210 are coupled to the brake housing 220 using mounting holes 222. Referring now to FIG. 3, in accordance with various embodiments, a brake actuator 300 is illustrated. In various embodiments, the brake actuator 300 is a brake actuator such as electronic brake actuators 204, 206, 208, or 210 of FIG. 2. In various embodiments, the brake actuator 300 includes an electrical connector 302 which couples to a main electrical connector via an electronic brake actuator cable. In various embodiments, the electrical connector 302 includes a keyway 304 for proper alignment of the electronic brake actuator cable. As described previously, the brake actuator 300 includes mounting holes 222 for mounting the brake actuator 300 to the brake housing 220, shown in FIG. 2.

Figure 4A:
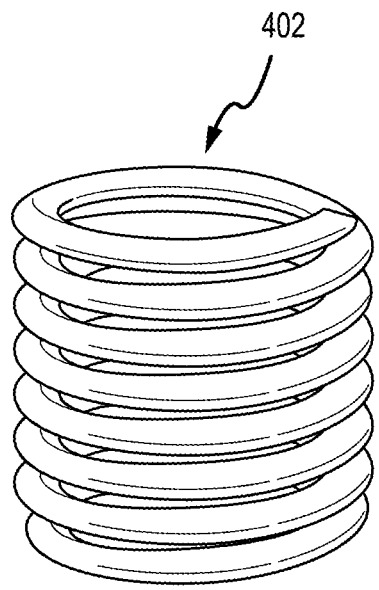
FIGS. 4A and 4B illustrate a helical coil, in accordance with various embodiments.
Figure 4B:
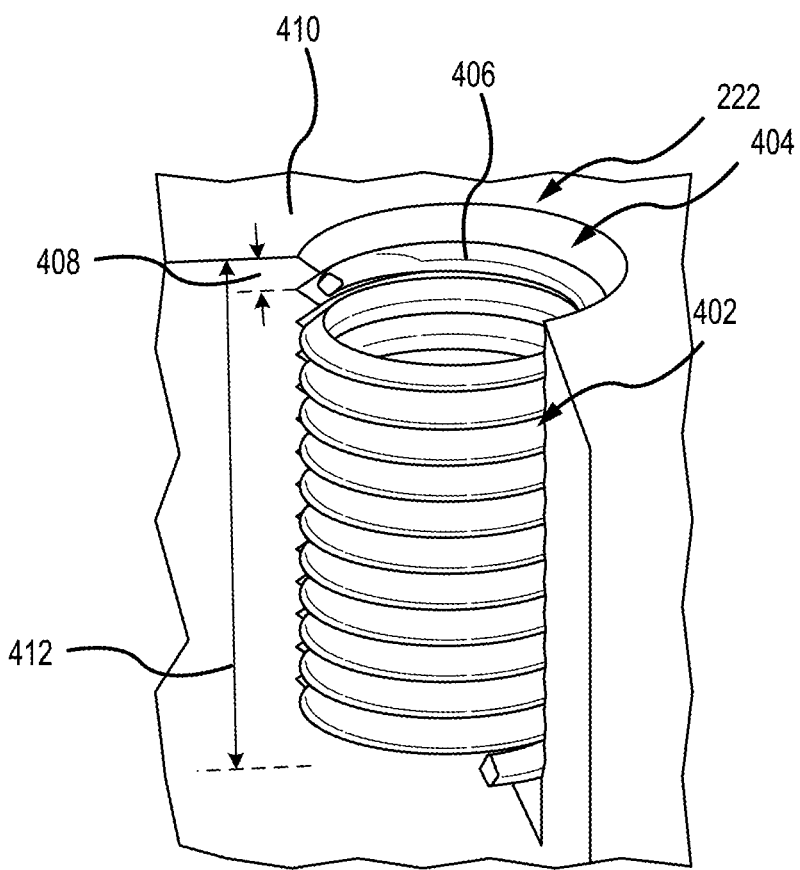
Figure 5:
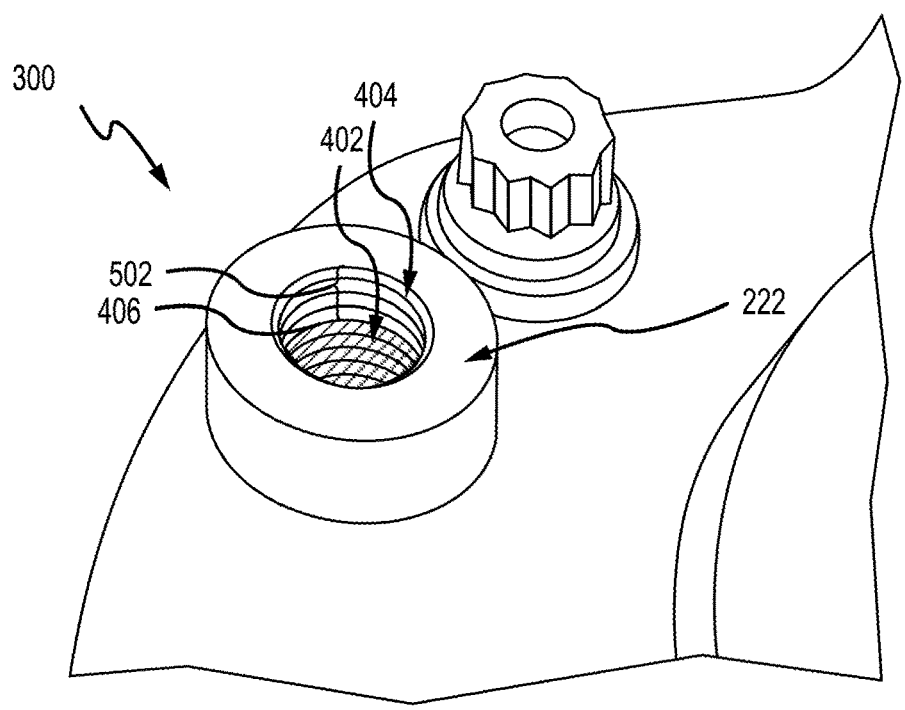
FIG. 5 illustrates an enlarged portion of the brake actuator, according to various embodiments.

Referring now to FIGS. 4A and 4B, in accordance with various embodiments, a helical coil 402 is illustrated. As illustrated in FIGS. 4B and 5, in various embodiments, the mounting hole 222 for mounting the brake actuator 300 to the brake housing includes pre-drilled threads 404. In various embodiments, in order that pre-drilled threads 404 of mounting hole 222 in brake actuator 300 exhibit increased thread strength and retention force, the helical coil 402, as illustrated in FIG. 4A, is inserted into pre-drilled threads 404 of the mounting hole 222, as seen in FIGS. 4B and 5. As is illustrated in FIG. 4B, the helical coil 402 is typically installed one thread revolution or pitch 408, i.e., a distance from the crest of one thread to the crest of another thread measured along the length of the thread, below the surface 410 of the mounting hole 222.

However, in some instances, a portion of the helical coil 402 may break off during extraction of brake actuator 300, such that the remaining contact end 406 of the helical coil 402 is more than one thread revolution or pitch 408 below the surface 410 of the mounting hole 222. In other instances, the helical coil 402 may be of a length that is shorter than a length 412 of the pre-drilled threads 404 and, therefore, the helical coil 402 may traverse further into the mounting hole 222 than intended, resulting in a deeply embedded helical coil 402, i.e., at least three to five thread pitches below the surface 410 of the mounting hole 222. For example, referring to FIG. 5, the contact end 406 of the helical coil 402 is approximately three to five thread pitches 502 below the surface of the mounting hole 222. When such instances occur, the brake actuator 300 must be fully disassembled in order for the deeply embedded helical coil 402 to be removed from the mounting hole 222 of the brake actuator 300.

Figure 6:
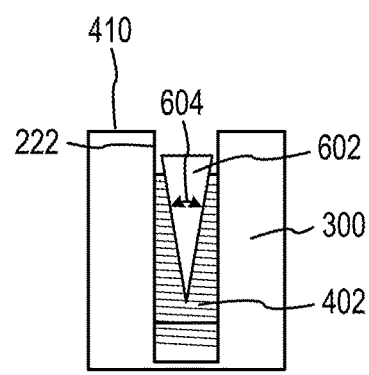
FIG. 6 illustrates a blade of a helical coil extraction device that engages with deeply embedded helical coils, according to various embodiments.
Figure 7:
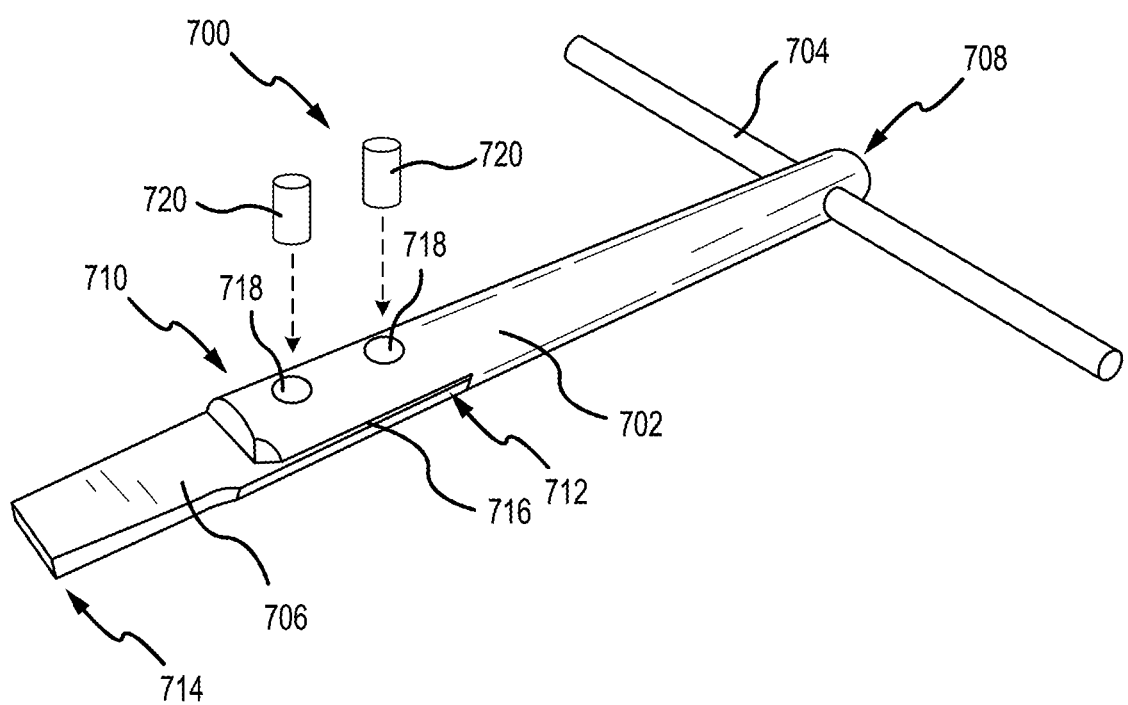
FIG. 7 illustrates a helical coil extraction device that engages deeply embedded helical coils, according to various embodiments.

Referring now to FIG. 6, in accordance with various embodiments, a blade 602 of a helical coil extraction device, such as helical coil extraction device 700 shown in FIG. 7, for engaging and extracting deeply embedded helical coils 402 is illustrated. In various embodiments, the blade 602 of the helical coil extraction device is designed with an angle 604, which allows a portion of the blade 602, for engaging with a helical coil 402 that is installed one thread revolution or pitch 408 below the surface 410 of the mounting hole 222, to traverse further into the mounting hole 222 of the brake actuator 300 free of contact with a side of the mounting hole 222 of the brake actuator 300 and allows the blade 602 to bite into the deeply embedded helical coil 402 so that the helical coil 402 may be removed from the mounting hole 222 by rotation of the blade 602 and the helical coil 402.

Referring now to FIG. 7, in accordance with various embodiments, helical coil extraction device 700 for engaging deeply embedded helical coils is illustrated. In various embodiments, the helical coil extraction device 700 includes a shaft 702, a handle 704, and a blade 706. In various embodiments, shaft 702 has a proximal end 708 and a distal end 710. In various embodiments, the handle 704 is coupled to the proximal end 708 of the shaft 702. In various embodiments, the blade 706 is coupled to the distal end 710 of the shaft 702. In various embodiments, the blade 706 has a proximal end 712 and a distal end 714. In various embodiments, the distal end 710 of the shaft 702 may include a slot 716 into which proximal end 712 the blade 706 may be inserted. In various embodiments, the distal end 710 of the shaft 702 may include a set of holes 718 through which a set of rivets 720 may be inserted. The set of rivets traverse through the set of holes 718 and corresponding holes in a proximal end 712 of blade 706, securing the blade 706 to the shaft 702.

Figure 8:
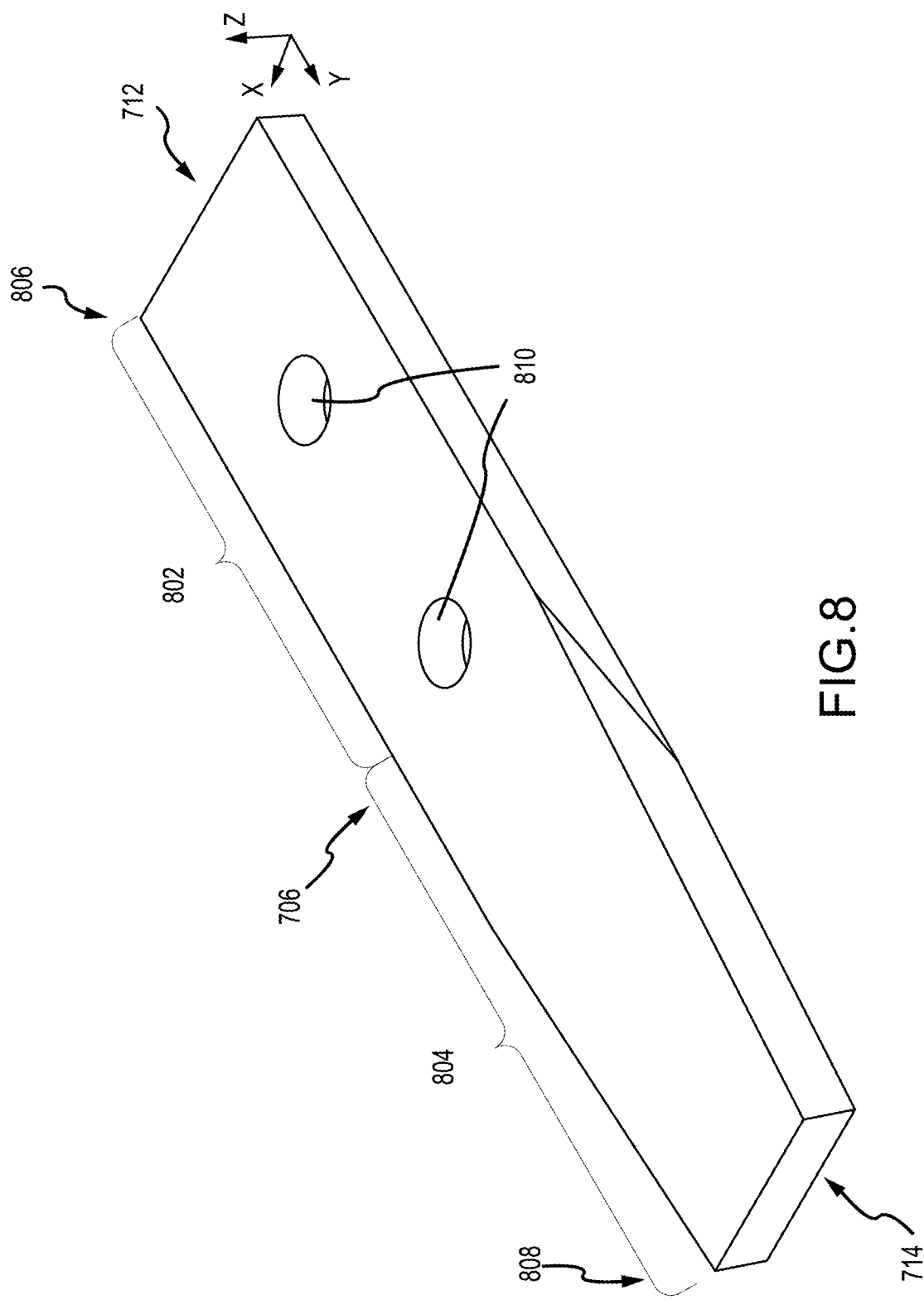
FIG. 8 illustrates an isometric view of a helical coil extraction device that engages deeply embedded helical coils, according to various embodiments.

Referring now to FIG. 8, in accordance with various embodiments, an isometric view of the blade 706 of the helical coil extraction device is illustrated. In various embodiments, the blade 706 has a first portion 802 and a second portion 804. In various embodiments, the first portion 802 is substantially rectangular in shape. In various embodiments, the second portion 804 tapers from first width at a first end 806 to a second width at a second end 808, where the second width is smaller than the first width. In various embodiments, the blade 706 further includes a set of holes 810 that correspond to the set of holes 718 in the shaft 702 of FIG. 7, through which the set of rivets 720 may traverse, securing the blade 706 to the shaft 702.

Figure 9:
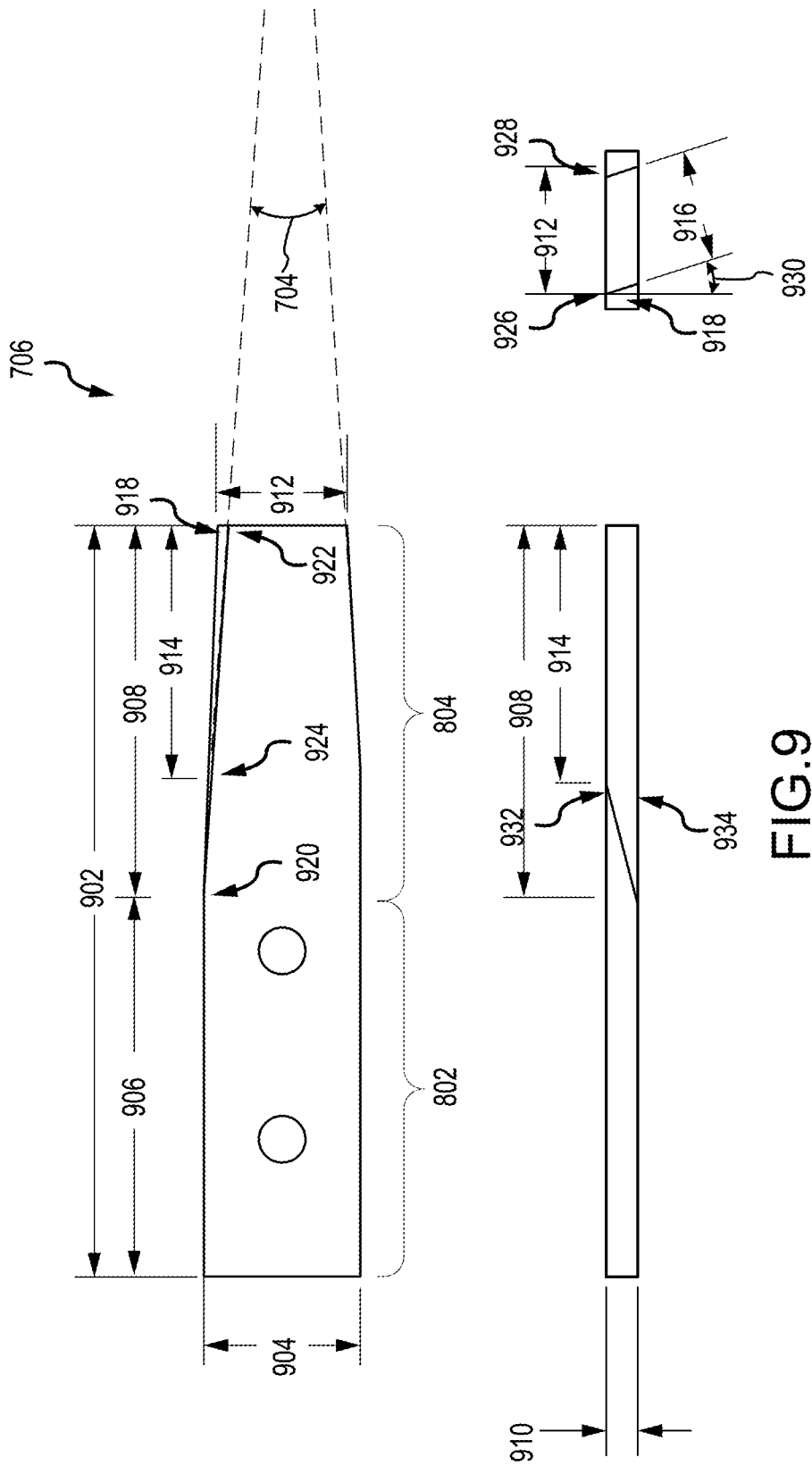
FIG. 9 illustrates dimensions of a blade of a helical coil extraction device that engages deeply embedded helical coils, according to various embodiments.

Referring now to FIG. 9, in accordance with various embodiments, dimensions of the blade 706 of the helical coil extraction device are illustrated. In various embodiments, the blade 706 has an overall length 902 that has an approximate diameter-to-length ratio of 5:24, with reference to the diameter of the helical coil, such as helical coil 402 of FIG. 4, and the overall length 902 of the blade 706. In that regard, if the helical coil has a ⁵⁄₁₆-inch nominal diameter, the overall length 902 of the blade 706 is approximately 1.5 inches. For example, the overall length 902 may be between 1.45 inches and 1.55 inches or between 1.475 inches and 1.525 inches if the helical coil has a ⁵⁄₁₆-inch nominal diameter. In various embodiments, the blade 706 has an overall width 904 that has an approximate diameter-to-width ratio of 1:1, with reference to the diameter of the helical coil, such as helical coil 402 of FIG. 4, and the overall width 904 of the blade 706. In that regard, if the helical coil has a 5/16-inch nominal diameter, the overall width 904 is approximately 0.312 inches. For example, the overall width 904 may be between 0.302 inches and 0.322 inches or between 0.307 inches and 0.317 inches if the helical coil has a 5/16-inch nominal diameter.

In various embodiments, the first portion 802 of the blade 706 has a length 906 that has an approximate diameter-to-length ratio of 5:12, with reference to the diameter of the helical coil, such as helical coil 402 of FIG. 4, and the length 906 of the first portion 802 of the blade 706. In that regard, if the helical coil has a 5/16-inch nominal diameter, the length 906 is approximately 0.75 inches. For example, the length 906 may be between 0.7 inches and 0.8 inches or between 0.725 inches and 0.775 inches if the helical coil has a 5/16-inch nominal diameter. In various embodiments, the second portion 804 of the blade 706 has a length 908 that also has an approximate diameter-to-length ratio of 5:12, with reference to the diameter of the helical coil, such as helical coil 402 of FIG. 4, and the length 908 of the second portion 804 of the blade 706. In that regard, if the helical coil has a 5/16-inch nominal diameter, the length 908 is approximately 0.75 inches. For example, the length 908 may be between 0.7 inches and 0.8 inches or between 0.725 inches and 0.775 inches if the helical coil has a 5/16-inch nominal diameter. In various embodiments, the blade 706 has an overall thickness 910 that has an approximate thickness-to-diameter ratio of 1:5, with reference to the thickness 910 of the blade 706 and the diameter of the helical coil, such as helical coil 402 of FIG. 4. In that regard, if the helical coil has a 5/16-inch nominal diameter, the overall thickness 910 is approximately 0.062 inches. For example, the overall thickness 910 may be between 0.058 inches and 0.066 inches or between 0.060 inches and 0.064 inches if the helical coil has a 5/16-inch nominal diameter.

In various embodiments, the second portion tapers from the overall width 904 to a second width 912. In various embodiments, the second width 912 that has an approximate width-to-diameter ratio of 4:5, with reference to the second width 902 of the blade 706 and the diameter of the helical coil, such as helical coil 402 of FIG. 4. In that regard, if the helical coil has a 5/16-inch nominal diameter, the second width 912 is approximately 0.250 inches. For example, the second width 912 may be between 0.230 inches and 0.270 inches or between 0.240 inches and 0.260 inches if the helical coil has a 5/16-inch nominal diameter. In various embodiment, the blade 706 tapers from the overall width of 904 to the second width 912 at an angle 704 of between 12 and 18 degrees. In various embodiment, the blade 706 tapers from the overall width of 904 to the second width 912 at an angle 704 of between 14 and 16 degrees. In various embodiment, the blade 706 tapers from the overall width of 904 to the second width 912 at an angle 704 of 15 degrees.

In various embodiments, the blade 706 includes beveled edges 918 that are also angled at angle 704 starting from the first end 920 of the second portion 804 to the second end 922 of the second portion 804 of the blade 706. In various embodiments, the beveled edge 918 that is also angled at angle 704 causes the bevel 918 to start on a first side of the blade but only contacts the second side of the blade at a first end 924 of a length 914 continuing to the second end 922 of the second portion 804 of the blade 706. In various embodiments, the length 914 has an approximate width-to-height ratio of 5:8, with reference to the diameter of the helical coil, such as helical coil 402 of FIG. 4, and the length 914 of the blade 706. In that regard, if the helical coil has a 5/16-inch nominal diameter, the length 914 is approximately 0.5 inches. For example, the length 914 may be between 0.46 inches and 0.54 inches or between 0.48 inches and 0.52 inches if the helical coil has a 5/16-inch nominal diameter. In various embodiments, the direction of the bevel edges 918 depends on the whether the pre-drilled threads, such as the pre-drilled threads 404 of FIG. 4B, are right-handed threads or left-handed threads. In that regard, the bevel of the bevel edges 918 may be in a first direction if the pre-drilled threads are right-handed threads and the bevel of the bevel edges 918 may be in a second direction opposite the first direction if the pre-drilled threads are left-handed threads. In various embodiments, an angled width 916 at the second end 922 of the blade 706 from edge 926 to edge 928 on either side of the blade 706 has an approximate width-to-diameter ratio of 1:1.4, with reference to the angled width 916 at the second end 922 of the blade 706 and the diameter of the helical coil, such as helical coil 402 of FIG. 4. In that regard, if the helical coil has a 5/16-inch nominal diameter, the angled width 916 is approximately 0.225 inches. For example, the angled width 916 may be between 0.215 inches and 0.235 inches or between 0.22 inches and 0.23 inches if the helical coil has a 5/16-inch nominal diameter. In various embodiment, an angle 930 of the beveled edge 918 is between 11 degrees and 19 degrees with respect the second width 912 of the blade 706. In various embodiment, the angle 930 of the bevel edge 918 is between 13 degrees and 13 degrees with respect the second width 912 of the blade 706. In various embodiment, the angle 930 of the beveled edge 918 is 15 degrees with respect the second width 912 of the blade 706.

In various embodiments, once the blade 706 is formed, the blade 706 may be hardened to improve an ability of the blade 706 to withstand the forces associated with removal of the helical coil 402. In various embodiment, the blade 706 may be protected from oxygen by wrapping the blade 706 in a heat treatment foil. In various embodiments, the blade 706 may then be heat treated at a temperature of between 1700 degrees Fahrenheit (° F.) and 1800° F. In various embodiments, the blade 706 may be heat treated at a temperature of between 1725° F. and 1775° F. In various embodiments, the blade 706 may be heat treated at a temperature 1750° F. Once heat treated, in various embodiments, the blade may undergo a first air quenching at a temperature of between 50° F. and 100° F. In various embodiments, the blade may undergo the first air quenching at a temperature of between 60° F. and 90° F. In various embodiments, the blade may undergo the first air quenching at a temperature of between 70° F. and 80° F. After the first air quenching, in various embodiments, the blade 706 may undergo a first tempering at a temperature of between 800° F. and 1000° F. In various embodiments, the blade 706 may undergo the first tempering at a temperature of between 850° F. and 950° F. In various embodiments, the blade 706 may undergo the first tempering at a temperature of 900° F.

After the first tempering, in various embodiments, the blade may undergo a second air quenching at a temperature of between 50° F. and 100° F. In various embodiments, the blade may undergo the second air quenching at a temperature of between 60° F. and 90° F. In various embodiments, the blade may undergo the second air quenching at a temperature of between 70° F. and 80° F. After the second air quenching, in various embodiments, the blade 706 may undergo a second tempering at a temperature of between 800° F. and 1000° F. In various embodiments, the blade 706 may undergo the second tempering at a temperature of between 850° F. and 950° F. In various embodiments, the blade 706 may undergo the second tempering at a temperature of 900° F. After the second tempering, in various embodiments, the blade may undergo a third and final air quenching at a temperature of between 50° F. and 100° F. In various embodiments, the blade may undergo the third and final air quenching at a temperature of between 60° F. and 90° F. In various embodiments, the blade may undergo the third and final air quenching at a temperature of between 70° F. and 80° F.

In various embodiments, the heat treatment, the first tempering and the second tempering may be performed for between 45 and 90 minutes. In various embodiments, the heat treatment, the first tempering and the second tempering may be performed for between 55 and 80 minutes. In various embodiments, the heat treatment, the first tempering and the second tempering may be performed for between 65 and 70 minutes.

Figure 10:
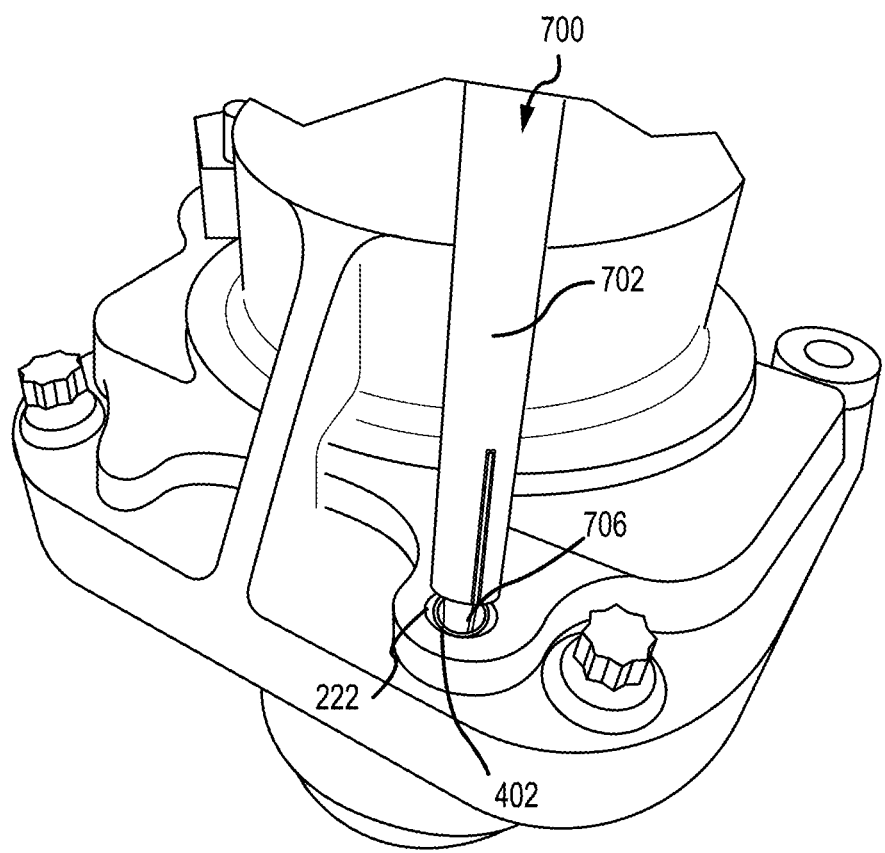
FIG. 10 illustrates a blade of a helical coil extraction device engaging with a deeply embedded helical coil, according to various embodiments.

Referring now to FIG. 10, in accordance with various embodiments, a blade of a helical coil extraction device engaging with a deeply embedded helical coil is illustrated. In various embodiments, the blade 706 is coupled to the shaft 702 of the helical coil extraction device 700. The blade 706, which is narrower in width, traverses further into the mounting hole 222 than is typically required to engage with a helical coil 402 that is installed one thread revolution or pitch 408 below the surface 410 of the mounting hole 222 and engages the helical coil 402, which is deeply embedded, i.e., at least three to five thread pitches below the surface 410 of the mounting hole 222, in the mounting hole 222. In various embodiments, to ensure the blade 706 engages the helical coil 402, the distal end of the shaft 702 may be tapped with another object, for example, pliers, a hammer, or the like. In various embodiments, the helical coil 402 may then be extracted by rotating the shaft 702 to which the blade 706 is coupled via a handle or a drill, among others, in a clockwise or counterclockwise direction depending on whether the threads are right-handed threads or left-handed threads. As stated previously, in various embodiments, the direction of the bevel edges of the blade 706 depends on the whether the pre-drilled threads, such as the pre-drilled threads 404 of FIG. 4B, are right-handed threads or left-handed threads. In that regard, the bevel of the bevel edges of the blade 706 may be in a first direction if the pre-drilled threads are right-handed threads and the bevel of the bevel edges of the blade 706 may be in a second direction opposite the first direction if the pre-drilled threads are left-handed threads.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for extracting a deeply embedded helical coil, the method comprising:
   inserting a blade into a mounting hole to engage the deeply embedded helical coil free of contact with a side of the mounting hole, the blade comprising a first portion and second portion and wherein the second portion of the blade is inserted into the mounting hole; and responsive to the blade engaging the deeply embedded helical coil, rotating the blade and the deeply embedded helical coil to remove the deeply embedded helical coil from the mounting hole, wherein the first portion of the blade is rectangular in shape and is configured to be inserted into and retained within a slot in a distal end of a shaft, wherein the second portion of the blade has an approximate diameter-to-length ratio of 5:12 with reference to a diameter of the mounting hole into which the second portion of the blade is inserted and a length of the second portion of the blade, wherein the second portion of the blade has an approximate thickness-to-diameter ratio of 1:5 with reference to a thickness of the blade and the diameter of the hole into which the second portion of the blade is inserted, and wherein the second portion of the blade is tapered at an angle such that a first width of the second portion of the blade tapers to a second width, wherein the second width is less than the first width, and wherein the second width has an approximate width-to-diameter ratio of 4:5 with reference to the second width of the blade and the diameter of the hole into which the second portion of the blade is to be inserted.

2. The method of claim 1, wherein the angle is between 12 degrees and 18 degrees.

3. The method of claim 1, wherein the blade comprises beveled edges along a portion of the second portion of the blade, wherein the beveled edges are further angled at the angle such that for a first edge the beveled edge is present along a first length of a first side of the second portion of the blade and is present along a second length of a second side of the second portion of the blade and for a second edge the beveled edge is present along the first length of the second side of the second portion of the blade and is present along the second length of the first side of the second portion of the blade, and wherein the second length is less than the first length.

4. The method of claim 1, wherein the method further comprises:
hardening the blade, wherein hardening comprises:
wrapping the blade in heat treatment foil;
heat treating the blade at a first temperature;
performing a first air quenching the blade at a second temperature that is less than the first temperature;
performing a first tempering at a third temperature, wherein the third temperature is less than the first temperature and more than the second temperature;
performing a second air quenching the blade at the second temperature;
performing a second tempering at the third temperature; and
performing a third air quenching the blade at the second temperature.

* * * * *